United States Patent [19]
Sibeud et al.

[11] 3,897,219
[45] July 29, 1975

[54] APPARATUS FOR THE REMOVAL OF HYDROGEN SULFIDE AND MERCAPTANS FROM LIQUID AND GASEOUS STREAMS

[75] Inventors: Jacques Pierre Sibeud, Princeton; Charles David Ruff, Highland Park, both of N.J.

[73] Assignee: Rhodia, Inc., New York, N.Y.

[22] Filed: Jan. 29, 1973

[21] Appl. No.: 327,278

Related U.S. Application Data

[63] Continuation-in-part of Ser. No. 166,894, July 28, 1971, abandoned.

[52] U.S. Cl................ 23/288 A; 23/288 E; 23/283; 261/122; 261/124
[51] Int. Cl.............................................. B01j 9/16
[58] Field of Search...... 23/288 A, 288 E, 285, 283; 261/122, 124; 55/52, 51, 53

[56] References Cited
UNITED STATES PATENTS
2,386,681 10/1945 Hadden............................ 23/285 X
3,188,286 6/1965 Van Driesen..................... 23/288 E

*Primary Examiner*—James H. Tayman, Jr.

[57] ABSTRACT

A contactor defining a substantially cylindrical reaction chamber; a gas feed inlet at the bottom of the reaction chamber; a liquid aqueous catalyst solution inlet at the bottom of the reaction chamber; means for forming an intimate unstable dispersion short of foam formation of gaseous oxygen, hydrogen sulfide, and alkyl mercaptans entering via the gas feed inlet in liquid aqueous catalyst solution and for passing the dispersion in turbulent flow concurrently upwardly through the reaction chamber; and a gas separator for reception of dispersion from the reaction chamber and defining a substantially cylindrical gas separation chamber directly above the reaction chamber, coextensive therewith in a central portion and having a peripheral portion extending circumferentially about and beyond the peripheral portion of the reaction chamber, the gas separation chamber having an overall diameter larger than the diameter of the reaction chamber and exposing a relatively large surface area of dispersion to a gas layer thereabove within the gas separation chamber to facilitate breaking of the dispersion into a lower liquid layer and separation of gas therefrom, the gas separator having in an upper portion a gas outlet for removal of the gas in the gas layer and, at or below the level of the liquid layer, a liquid outlet for liquid aqueous catalyst solution containing sulfur and dialkyl disulfides, and means for maintaining a liquid level within the gas separation chamber and thereby within the reaction chamber by overflow; the ratio of the diameter of the reaction chamber to the diameter of the gas separator chamber being within the range from about 1:1.2 to about 1:20, expressed in metric units, the length of the reaction chamber being within the range from about 2 feet to about 20 feet, and the diameter of the reaction chamber being within the range from about 4 inches to about 40 feet, the ratio of diameter to height of the gas separation chamber being within the range from about 60:1 to about 1:1, the height of the gas separation chamber being within the range from about 2 inches to about 10 feet, and the diameter of the gas separation chamber being within the range from about 5 inches to about 60 feet.

6 Claims, 2 Drawing Figures

APPARATUS FOR THE REMOVAL OF HYDROGEN SULFIDE AND MERCAPTANS FROM LIQUID AND GASEOUS STREAMS

This application is a continuation-in-part of Ser. No. 166,894, filed July 28, 1971, and now abandoned.

The removal of hydrogen sulfide and alkyl mercaptans from liquid and gaseous streams, such as the waste gases liberated in the course of various industrial chemical processes, for example, in the pulping of wood, and in petroleum refining, has become increasingly important in combating atmospheric pollution. Such waste gases not only have an offensive odor, but they may also cause damage to vegetation, painted surfaces, and wild life, besides constituting a health hazard to humans. The authorities have increasingly imposed lower and lower tolerances on the content of such gases vented to the atmosphere, and it is now imperative in many localities to remove virtually all of the hydrogen sulfide and alkyl mercaptans, under the penalty of an absolute ban on continuing operation of the plant.

The quantities of hydrogen sulfide and mercaptans in waste gases are often not very high. Dunn U.S. Pat. No. 3,071,433 dated Jan. 1, 1963 indicates that the stack gases obtained in the concentration of black liquor, the waste pulping liquor of the kraft pulping process, contain from 500 to 2,000 parts per million of hydrogen sulfide. However, hydrogen sulfide can be detected by humans at a concentration of approximately 0.01 part per million. The result is that an extremely efficient process for the removal of hydrogen sulfide and alkyl mercaptans is required for effective capture of small amounts of these materials.

Engelhardt U.S. Pat. No. 1,479,852 dated Jan. 8, 1924 describes a method of catalyzing the oxidation of hydrogen sulfide to free sulfur using a heterogeneous solid-vapor catalysis mechanism, passing the gas containing hydrogen sulfide through a bed of active carbon which serves as an extended-surface catalyst. Engelhardt further discloses that the process is improved by the addition of ammonia or amines. However, the process is accompanied by the evolution of heat, so that molten sulfur is produced which clogs the reaction chamber, and the fused sulfur is extremely difficult to remove from the bed, when catalyst regeneration becomes necessary.

Herold et al U.S. Pat. No. 1,984,971 dated Dec. 18, 1934 proposes to improve this treatment by passing the gas through extended surface solid-catalyst beds in a plurality of stages, with cooling between the stages. This keeps the temperature in the beds below the fusion temperature of the deposited sulfur, but, since this requires operation at a lower temperature, larger catalyst beds are necessary, and this, in turn, increases the regeneration problem. At the same time, there is a considerable pressure drop in forcing the gas through a plurality of beds. When the large quantities of stack gas that have to be treated and the small quantities of hydrogen sulfide in such gases are considered, it is apparent that the size and expense of the catalyst-treating plant are very large.

Gislon and Quiquerez U.S. Pat. No. 2,659,691 dated Nov. 17, 1953 describes the conversion of mercaptans in petroleum products into disulfides by oxidation. The patent discloses that certain organic substances, especially organometallic compounds with chelated bonds, have the property of absorbing oxygen from air and of releasing it under certain conditions. The metal chelates that are disclosed include iron-indigo complexes, disalicylal ethylene diamino cobalt, and bidisalicylal ethylene diamine-aquo cobalt.

The patent indicates that these compounds behave as oxidation catalysts, and in the presence of a solvent for the chelate, the absorption and exchange of oxygen with the mercaptans to form the sulfide proceed simultaneously. Further, the same effect is obtained in the presence of water, and it is advantageous to use a solution or dispersion of the chelate in the solvent. The patent discloses a catalyst system which could not be used in aqueous solution, since the chelate is insoluble in water. The patent does not indicate, moreover, that the chelate would be effective to oxidize hydrogen sulfide to sulfur.

Dunn in U.S. Pat. No. 3,071,433 proposed to substitute a process in which the catalyst was present in the liquid phase, rather than as a solid. The catalyst used was selected from the class consisting of ammonia, aliphatic amines and alicyclic amines. The liquid catalyst, a solvent solution of the amine or ammonia, is simply sprayed into the stack gases while confined in the stack of the mill or plant. The catalyst does its work in admixture with the gases, and is carried off therewith, to complete its catalytic function in the open air. The sulfur is removed as well, settles out over the surrounding countryside, and is washed away from time to time, by rainfall.

The Dunn process accordingly substitutes particulate sulfur pollution for hydrogen sulfide pollution, and in addition leads to a steady consumption of catalyst. Besides that, the hydrogen sulfide may be dissipated before it is oxidized to sulfur in dilution of the stack gases containing the catalyst, when they encounter the outside atmosphere upon emergence from the stack.

Hartley, Craig and Sapiro U.S. Pat. No. 3,068,065 dated Dec. 11, 1962 suggest an entirely different approach. Hartley et al point out that it is known that hydrogen sulfide can be removed from waste gases using an alkaline, iron-containing liquor, consisting essentially of a suspension of iron oxide, hydrated iron oxide, or basic iron carbonate, in a solution of sodium or ammonium carbonate or bicarbonate. The hydrogen sulfide reacts first with the alkali to form alkali sulfide, and this in turn reacts with the iron in suspension to form iron sulfide. The reaction is not instantaneous, and it does not completely remove hydrogen sulfide from the gas. The fouled liquor has to be aerated to oxidize the iron, liberate sulfur, and regenerate it for reuse. Besides that, the iron is present as a suspension of solid material, and as a result there is a continuing loss of reagent associated with the removal of the sulfur liberated from the system.

This difficulty Hartley et al overcome by using the iron in chelated form, in aqueous solution. Hartley et al found that solutions of iron complexed with chelating agents are reduced to the ferrous condition by hydrogen sulfide, and are readily reoxidized in a separate step to the ferric condition by aeration. Consequently, Hartley et al passed the gas bearing the hydrogen sulfide impurity through a conventional gas-washing tower, the gas flowing upwards countercurrently to the descending aqueous solution of chelated ferric iron, which is sprayed into the top of the tower, and descends against the gas flow. In a separate step, the liquor from the tower is then aerated by introduction of air, or by pumping the liquor through air injectors, to regenerate to ferric iron the iron which is converted to ferrous iron in the course of the reaction, and the sulfur is removed from the aerated liquor by known means. This is essentially a two-step process, the catalyst requiring regeneration in a separate stage, and besides that, the removal of hydrogen sulfide is not quantitative, primarily because of physical difficulties in effecting efficient distribution of the fluid catalyst in the gas system. Since the gases are very insoluble in the iron chelate liquor, the reaction essentially takes place at the interface between the gas and the liquid, and it is extremely difficult to ensure such contact with all portions of the gas passing through the tower, particularly when large volumes of gas are being treated at high flow rates. The difficulty of effective separation increases, the more dilute the hydrogen sulfide- and alkyl mercaptan-containing gas stream.

Pitts, Jr. et al U.S. Pat. No. 3,097,925 dated July 16, 1963 propose to convert hydrogen sulfide to elemental sulfur by an oxidation-reduction system comprising a polyvalent metallic ion chelate complex solution wherein hydrogen sulfide is oxidized to sulfur and the reduced metallic cation is oxidized to its original valence state by a free-oxygen containing gas in a second step. These reactions can be performed concurrently in the same solution. The metallic ion can be ferric iron, in which case the reaction is $$2FeCl_2 + H_2S \rightarrow 2FeCl_2 + S + 2HCl.$$

In the absence of a chelating agent, if the solution is basic, and the solubility product of FeS is exceeded, FeS also precipitates. However, the objective is to regenerate ferric iron:

$$4FeCl_2 + 4HCl + O_2 \rightarrow 4FeCl_3 + 2H_2O.$$

The net result is:

$$2H_2S + O_2 \rightarrow 2S + 2H_2O$$

The chelating agent prevents precipitation of FeS, and increases the rate of regeneration of ferric iron.

Alkyl mercaptans are oxidized to dialkyl disulfides:

$$4RSH + O_2 \rightarrow 2RSSR + 2H_2O.$$

Table I of Pitts indicates that the removal of $H_2S$ by oxidation to sulfur varied from 78.1 to 99.0 percent and reached 100 percent only once. However, calculations show that the proportions of $H_2S$ and iron chelate in the runs in Table I are so low that the reaction is not catalytic during the first hour of operation, indicating the need either for a longer reaction time or for a large amount of chelated iron catalyst for good results. Pitts et al do not appear to be aware of this. The reactor of FIG. 1 is a simple tank, and no mention is made of requirements for efficient contact at the interface. No indications are given as to the required residence time of the gas phase.

Meuly and Seldner U.S. Pat. No. 3,226,320 dated Dec. 28, 1965 tackled the problem in a slightly different way. Meuly et al suggested spraying into the stack gas a solution of a chelate of a polyvalent metal with ethylene diamine tetraacetic acid, N-hydroxyethyl ethylene diamine triacetic acid, and other chelating agents. Among the polyvalent metal chelates that can be used are ferric chelates. The liquid catalyst is sprayed into the vent system as a mist, and reacts with the pollutant sulfur compounds in the gases. The reaction continues in the atmosphere, if the catalyst is entrained in the gas. Air can be introduced into the reaction system at the same time. The oxygen in the air or in the atmosphere beyond the stack serves to oxidize the hydrogen sulfide or mercaptan. This reaction is not fully efficient either, and the concentration of hydrogen sulfide reported is reduced from 1,400 ppm to 300 ppm, in the case described in Example 24 of the patent. Besides that, there is a considerable loss of catalyst to the atmosphere, and the result as in Dunn is that particulate sulfur is the pollutant in place of hydrogen sulfide.

French Pat. No. 1,492,797 dated July 17, 1967 to Institut Francais du Petrole des Carburants et Lubrifiants describes a process for converting hydrogen sulfide to sulfur by oxidation with air or oxygen, using a polyol or polyol ether as a solvent for hydrogen sulfide and containing a small amount of an organic base acting as a catalyst. The conversion of hydrogen sulfide to sulfur takes place with the production of water. One part of this water is carried along by the air, which is used as an oxidizer; the other part accumulates in the solvent, and dilutes it. The accumulation of this water leads to an increase in the production of by-products, which is undesirable, and consequently it is necessary continuously to concentrate the solvent for reuse.

Renault and Gruhier British Pat. No. 1,223,732 published Mar. 3, 1971 describes a similar reaction in which water-insoluble solvents are used, in order to eliminate the water concentration problem of French Pat. No. 1,492,797. The solvents used in this process are the phosphoric esters of alkyl, cycloalkyl and aryl alcohols, and alkanolamines are used as a catalyst in these solutions.

Dutch patent application Ser. No. 68/16273 published May 20, 1969 and French Pat. No. 1,604,644 published Feb. 11, 1972 to Kobe Steel, Ltd. describe the conversion of $H_2S$ to sulfur with the aid of a "lignine oxydante." The term is defined at the bottom of page 3 as inclusive of a number of derivatives of lignin, both natural and as recovered from wood. When $H_2S$ is brought into contact with lignine oxydante, the $H_2S$ is transformed into sulfur, which can be easily separated from the gases and liquids present. While the lignine oxydante is simultaneously reduced and deactivated, it can be completely regenerated by treatment with air or oxygen. Consequently, when the contact of lignine oxydante is carried out in the presence of air or oxygen, the separation and conversion of $H_2S$ to sulfur can be realized continuously.

The process achieves only from 87 to 98 percent recovery of $H_2S$ from the material treated. In Example 1, No. 13, the solution of lignine oxydante contains 0.05 percent of the lignine oxydante and 0.04 percent of ferric chloride, with a quantity of ethylene diamine tetraacetate sufficient to chelate the ferric chloride. In Example 4, No. 11, the lignine oxydante solution contained 0.2 percent of lignine oxydante and 0.1 percent of ferric chloride, with a quantity of ethylene diamine tetraacetate sufficient to chelate the ferric chloride. However, in neither Example does the ferric chelate appear to improve the lignine oxydante.

It has now been determined that the oxidation and catalyst regeneration reactions in the oxidation-reduction metal chelate reaction system can each be made to proceed extremely rapidly if the state of subdivision of the free-oxygen-containing gas is sufficiently fine, although short of foam formation. The limiting factor, it has been discovered, in catalyst regeneration is the contact surface area between the oxygen-containing gas and the liquid phases, and if a sufficient contact area is achieved, catalyst regeneration can become virtually as rapid a reaction as the hydrogen sulfide and alkyl mercaptan oxidation. This has not hitherto been appreciated. In fact, it appears that the reaction is slow not for chemical reasons, but for physical reasons, primarily arising from contact difficulties due to the presence of two phases, one gas and one liquid.

An important aspect of the physical difficulties in achieving good contact is the fact that gas-liquid dispersions as well as foams are formed that are bothersome, and difficult to break. Because of this, a conventional gas-liquid contact apparatus cannot as a practical matter be used where large amounts of gases moving at relatively high velocities are to be treated.

Thus, there is provided in accordance with the invention apparatus achieving an efficient contact between the oxygen gas phase (most commonly air), the gaseous stream containing hydrogen sulfide and alkyl mercaptans and the liquid aqueous metal chelate catalyst, so as to increase the rapidity of the metal oxidation-reduction reactions, and also the speed of the conversion of hydrogen sulfide and alkyl mercaptans.

The apparatus in accordance with the invention comprises, in combination, a contactor through which is passed a fine dispersion short of foam formation of the oxygen, hydrogen sulfide and any alkyl mercaptans in aqueous metal chelate catalyst solution and a gas separator for reception of the dispersion from the contactor, where a sudden diminution in flow velocity in a relatively quiescent zone facilitates breaking of the dispersion and separation of gas from the dispersion, with separate outlets for gas and liquid therefrom. In a preferred embodiment, the apparatus includes also means for separating sulfur and alkyl disulfide from the liquid, and recycling the liquid to the contactor. Also in a preferred embodiment, the cntactor is below the separator chamber, with a direct connection at the top to the bottom of the contactor.

Another preferred embodiment of the apparatus comprises, in combination, a contactor defining a reaction chamber through which a fine dispersion short of foam formation of the oxygen, hydrogen sulfide, any alkyl mercaptans, and aqueous metal chelate catalyst solution is passed, and a gas separator reception of dispersion from the reaction chamber, exposing a relatively large surface area of dispersion to facilitate breaking and separation of gas from the dispersion, with separate outlets for gas and liquid therefrom. The ratio of reaction chamber diameter to gas separator diameter is within the range from about 1:1.2 to about 1:20

In a further preferred embodiment, the apparatus includes means for separating sulfur and any alkyl disulfide from the liquid, and recycling the liquid to the reaction chamber. Also in a preferred embodiment, the reaction chamber is below the separator chamber, with a direct connection at the top to the bottom of the separator chamber.

An important functional aspect of this apparatus is the relatively wide separation zone following the reaction zone. This establishes a relatively quiescent zone which leads to a rapid breaking of the dispersion, and separation of the gases and liquid.

Accordingly, one mode of using the apparatus of the invention for removing hydrogen sulfide and alkyl mercaptans from gaseous streams comprises dispersing the gaseous stream in an aqueous metal chelate solution in a volume ratio gas:liquid within the range from about 0.25:1 to about 1:0.25 to form a fine dispersion short of foam formation, passing the dispersion through a reaction zone, where hydrogen sulfide is converted to sulfur and alkyl mercaptans are converted to dialkyl disulfides, and then introducing the dispersion in a relatively quiescent separation zone where the gas separates from the liquid solution containing sulfur and any dialkyl disulfides, and withdrawing liquid solution from such zone, and separating sulfur and dialkyl disulfides therefrom; and recycling the metal chelate solution to the reaction zone.

It has also been determined that the oxidation and catalyst regeneration reactions are further enhanced and side reactions inhibited if an organic amine is present in the oxidation-reduction metal chelate reaction system, and the chelating acid is preferably an amino acid. The conversion of hydrogen sulfide to sulfur can then proceed virtually quantitatively, with side reactions leading to thiosulfuric acid, sulfuric acid and other by-products suppressed.

Thus, further in accordance with the invention, a continuous and cyclic mode of using the apparatus is provided for the removal of hydrogen sulfide and alkyl mercaptans contained in liquid and gaseous streams, converting them by catalytic oxidation using an aqueous metal (preferably amino acid) chelate solution as the catalyst to elemental sulfur and dialkyl disulfides, respectively, recovering and recycling the metal chelate catalyst solution after separation of sulfur and dialkyl disulfides, which comprises contacting the fluid stream with free oxygen gas and the aqueous metal chelate catalyst solution in the presence of an organic amine. The reaction proceeds with great rapidity, at room temperature and atmospheric pressure, being virtually quantitative in as little as a fraction of a second after contact has been achieved between the catalyst and the hydrogen sulfide or alkyl mercaptan and oxygen, and due to the inhibition or lessening of side reactions, is superior in result to a like process using an aqueous metal (preferably amino acid) chelate solution alone, even though of like alkalinity, due to the presence of an inorganic base. Thus, alkalinity alone is not a factor; the presence of the amine is critical in this improved result.

The metal chelate catalyst does not require regeneration in a seperate step. If -ous ion (or other ion of lower valence state) is formed, it is regenerated to -ic ion (or other ion of higher valence state) as rapidly as it is formed, so that -ous ion is not detected in the reaction system. The catalyst thus is not apparently degraded, nor is it consumed, and since mechanical losses are kept low, it has an unlimited life.

The sulfur is formed in the aqueous phase as a granular solid that can be removed by mechanical means. The alkyl mercaptans are oxidized to dialkyl disulfides, which are water-in-soluble oils, and can be removed physically from the liquid catalyst solution by appropriate separators, either continuously, or when they build up in sufficient amount. The processes are particularly adapted for continuous operation, since they are completed rapidly in a single step.

The reactions that take place in the course of the processes of the invention can be represented by the following reaction equations, using iron as the illustrative metal ion:

1. Oxidation of hydrogen sulfide to elemental sulfur:
   a. $2Fe^{+++} + H_2S \rightarrow 2Fe^{++} + 2H^+ + S$
   b. $2Fe^{+++} + 2RSH \rightarrow 2Fe^{++} + 2H^+ + RSSR$ 2. Regeneration of ferric ion:

$2Fe^{++} + \tfrac{1}{2} O_2 \rightarrow 2Fe^{+++} + O^{--}$

3. Over-all reaction for the two steps:

$H_2S + \tfrac{1}{2} O_2 \rightarrow S + H_2O$

$2RSH + \tfrac{1}{2} O_2 \rightarrow RSSR + H_2O$

Thus, the reaction system is an oxidation-reduction system in which the soluble -ic ion( or other higher valence state) complex (in which the ion is kept in solution by means of a chelating agent) oxidizes hydrogen sulfide to sulfur and alkyl mercaptans to dialkyl disulfides, while the resulting -ous ion (or other lower valence state) complex is reoxidized at once by free oxygen to the -ic state (or other higher valence state). The oxidation of -ous to -ic ion by means of atmospheric oxygen depends considerably upon the state of subdivision of the oxygen and the pH of the reaction medium. In the case of iron, at acid pH's on the low side, within the range from pH 1 to about pH 5, the reaction is slow. At a pH above 7, in the absence of a chelating agent, ferrous iron is precipitated from its aqueous solution as highly insoluble ferrous hydroxide, which is oxidized by air to the ferric state only slowly and incompletely. When the iron ions are present as soluble chelate complexes, however, they remain in solution to a pH of at least about 10, and at a pH within the range from about 6.8 to about 10, with a good dispersion of oxygen therein and a high contact surface area, the reoxidation of ferrous iron to ferric iron is so fast that reactions (1) and (2) above run concurrently. Due to the low solubility of oxygen in water, however, reaction (2) probably still represents the limiting factor in the speed of the over-all reaction.

The apparatus can be used to process any liquid or gaseous stream containing hydrogen sulfide and/or alkyl mercaptans in any concentrations, even in very low concentrations, of the order of a few parts per million. Streams which can be freed from hydrogen sulfide and alkyl mercaptans by the apparatus of the invention include sour gases and waste gases from petroleum refining, stack gas from cellulose pulping processes, gaseous and liquid effluents from sewage disposal plants, tail gases from Claus process units, and hydrogen sulfide- and alkyl mercaptan-containing waste gases from other chemical and industrial processes. While the apparatus of the invention is applicable to liquid streams containing hydrogen sulfide and/or alkyl mercaptans, to facilitate recovery of the metal chelate catalyst solution from the liquid stream, the liquid should preferably be immiscible therewith. Immiscibility may arise from the presence of water-immiscible liquids in the stream, or from other factors. It is possible to use the apparatus with water-miscible streams, provided any miscible materials that blend in with the catalyst solution either can be separated therefrom before recycling, or are nondeleterious and can be recycled therewith indefinitely without disadvantageously affecting its catalytic activity, or the user is willing to consume catalyst without recycling it.

As the metal ion, any polyvalent metal susceptible to oxidation and reduction between valence states in which it is solubilized by the chelating agent can be used. The most effective are chromium, cobalt, copper, iron, lead, manganese, mercury, molybdenum, nickel, palladium, platinum, tin, titanium, tungsten, and vanadium. Iron, cobalt, and nickel are preferred, and iron particularly is preferred. These are known catalytic metal chelates, disclosed in Meuly et al. U.S. Pat. No. 3,226,320, and form no part as such of the instant invention.

The metal chelate complex can be formed from any chelating compound which is capable of solubilizing the metal ion in complex ion form in both its lower and higher valence states in which it exists in the aqueous system. When, however, the reaction is carried out in the presence of an amine, the preferred chelating agent is an amino acid of the type.

in which at least two of the groups X are selected from the class consisting of acetic acid and propionic acid groups, and in which R is an alkyl group with at least two carbon atoms in the chain. Alternatively, R may be cyclohexane, the nitrogen atoms being attached to the ring in the 1,2-(ortho)positions. In another suitable form, R is a benzene ring, the nitrogen atoms being substituted for hydrogen atoms in the 1,2-positions, and chlorine or methyl being substituted for hydrogen in at least one of the 3- and 6-positions in the ring.

Specific examples of suitable amino acids are ethylene diamine tetraacetic acid, 1,2-diaminocyclohexane-N,N'-tetraacetic acid, diethylenetriamine pentaacetic acid, N-hydroxyethyl ethylene diamine triacetic acid, and the trisodium salt of N-hydroxyethyl ethylene diamine triacetic acid ($Na_3HEDTA$).

Other chelating agents capable of solubilizing the metal ion in complex ion form in aqueous solution can be used, such as acetyl acetone, gluconic acid, tartaric acid, and citric acid. The chelating agent should not be reactive with hydrogen sulfide or alkyl mercaptans, or the catalyst will be destroyed in the course of the process.

The concentration of metal ion in the catalyst solution is not critical. An effective catalytic action is obtained in amounts as low as 0.1 percent by weight of the solution. Amounts as high as 75 percent, up to a saturated solution, can be used, with excellent results. The higher the catalyst concentration, the shorter the contact time required; but even at an 0.1 percent catalyst concentration, a contact time of 25 seconds is quite adequate to ensure a virtually quantitative conversion. Concentrations of metal ion in the catalyst solution within the range from about 0.01 percent to a saturated solution, preferably from about 0.1 to about 5 percent, are effective, and can be employed.

The oxygen can be pure oxygen, or diluted with inert gas, such as air. Air is least costly as the oxygen source, and is preferred, but if gas volume should be kept low, pure or relatively pure oxygen can be used.

A quantitative reaction is obtained at room temperature, so that there is no need to employ higher temperatures. However, higher temperatures can be used, if desired or necessary. For instance, hot gases can be treated provided that care is taken to compensate for the water lost by evaporation. If an amine is used, it should be high boiling so that the amine is not volatilized and lost to the atmosphere by entrainment by the hot gases. The higher the reaction temperature, the faster the reaction rate; but since a very rapid reaction is obtained even at room temperature, there is usually no need to employ reaction temperatures in excess of 100°C.

It has been found that addition of an amine to the solution of metal ion and chelating agent is markedly beneficial. The effect of an amine is to enhance the catalytic efficiency of the metal ion-chelating agent system in the removal of hydrogen sulfide and alkyl mercaptans, an effect which is quite surprising, since dispersing the gases into a solution of an amine alone does not quickly eliminate hydrogen sulfide and alkyl mercaptans. The amine has an additional catalytic effect, in that it may also control the reaction so that the formation of thiosulfuric acid, sulfuric acid, and other by-products is inhibited; in some cases, they are not formed, and in others they are formed in lesser and even negligible amounts. This slows the buildup in the catalyst solution of these soluble acid by-products, which have the effect of reducing the pH of the solution, which should be held within the range from about 6.8 to about 10. Even though without the amine the side reactions may take place only slowly, the by-products accumulate more rapidly and become noticeable sooner in continuous and semicontinuous and in large and long-run batch operations that in the presence of the amine and, without the amine, addition of inorganic bases to adjust the pH to the proper range becomes a continuous necessity. Such additions increase the salt content of the chelate solution. If, for instance, sodium hydroxide is used to adjust the pH, a buildup of sodium sulfate and thiosulfate in the catalytic system will result. Buildup of soluble by-products is undesirable, for obvious reasons.

For optimum operation, the pH of the system should be within the range from about 6.8 to about 10.

It is possible to adjust the pH of the solution by addition of inorganic alkali, such as an alkali metal hydroxide, for example, sodium hydroxide, potassium hydroxide, or lithium hydroxide. It appears, however, that the alkali metal hydroxides do not enhance the catalytic effect of the chelate in the removal of hydrogen sulfide, and do not inhibit by-product formation, as does an amine. Since amines are alkaline, they can serve a triple purpose: (1) to enhance the catalytic action of metal-amino acid chelate systems; (2) to suppress formation of acidic by-products, thus obviating the need for constant pH corrections during the process; and (3) to bring the pH to the desired level in preparing the catalyst, thus completely eliminating the need of using inorganic bases. There is no objection, however, to using the amine in the presence of inorganic bases, if desired.

Concentrations of amine as small as 0.1 percent are noticeably effective, but concentrations of at least about 1 percent are preferred. When small amounts of amine are used, the pH is adjusted to the desired level with inorganic bases. A larger amount of amine, in excess of about 5 percent, will permit the amine to be substituted for the inorganic base in adjusting the pH of the catalytic solution. There is no critical upper limit on the amount of amine, but at amounts in excess of about 25 percent, the larger amount does not give a commensurate improvement. Amounts in excess of about 50 percent are not generally used. The working Examples show concentrations of amines of about 10 percent, but larger amounts, up to about 50 percent, can be used, in conjunction with the metal ion chelating agent components.

As the highly alkaline organic amine, any lower watersoluble aliphatic, alicyclic or heterocyclic amine can be used, such as, for example, methylamine, ethylamine, propylamine, butylamine, isobutylamine, tertiary-butylamine, secondary-butylamine, dimethylamine, diethylamine, trimethylamine, triethylamine, tripropylamine, tributylamine, triisobutylamine, monosecondary-butyl-diisopropylamine, monoethyl dipropylamine, and monoethyl dibutylamine, monoethanolamine, diethanolamine, triethanolamine, monopropanolamine, pyridine, morpholine, cyclopentylamine, piperidine, and cyclohexylamine.

The stoichiometric amount of oxygen to oxidize hydrogen sulfide to elemental sulfur in the reaction of the invention is about one-half part per part of the hydrogen sulfide and one-sixth part per part of the methyl mercaptan, for instance. If the oxygen is available in the form of air, the theoretical requirement in the case of hydrogen sulfide is about five times this, or 2.5 parts of air per part of hydrogen sulfide, and five-sixths part per part of alkyl mercaptan. If the stream of air contains less than the explosive limit of 4.3 percent hydrogen sulfide, the available oxygen is at least tenfold theoretical.

It has been established that in most cases it is desirable to employ at least a fourfold excess of the air stoichiometrically required for quantitative oxidation of hydrogen sulfide to elemental sulfur with subsequent regeneration of the catalyst. When the quantities of air are below this, it is apparently more difficult to ensure adequate contact between the oxygen and the hydrogen sulfide and the catalyst. On the other hand, the use of more than a fourfold excess gives an increase in reaction speed, and shortens the reaction time as well as increasing the efficiency of the reaction in terms of the proportion of hydrogen sulfide removed, so that the yields approach quantitative yields. There is no critical upper limit on the amount of oxygen or air except that imposed by the ratio of liquid:gas in the reaction zone of about 0.25:1, this including both oxygen or air and the gaseous stream being treated. The ratio of oxygen:gaseous stream should not exceed about 20:1, for an efficient oxygen utilization, but more oxygen than this can be used, up to about 40:1.

Figures 1, 2:
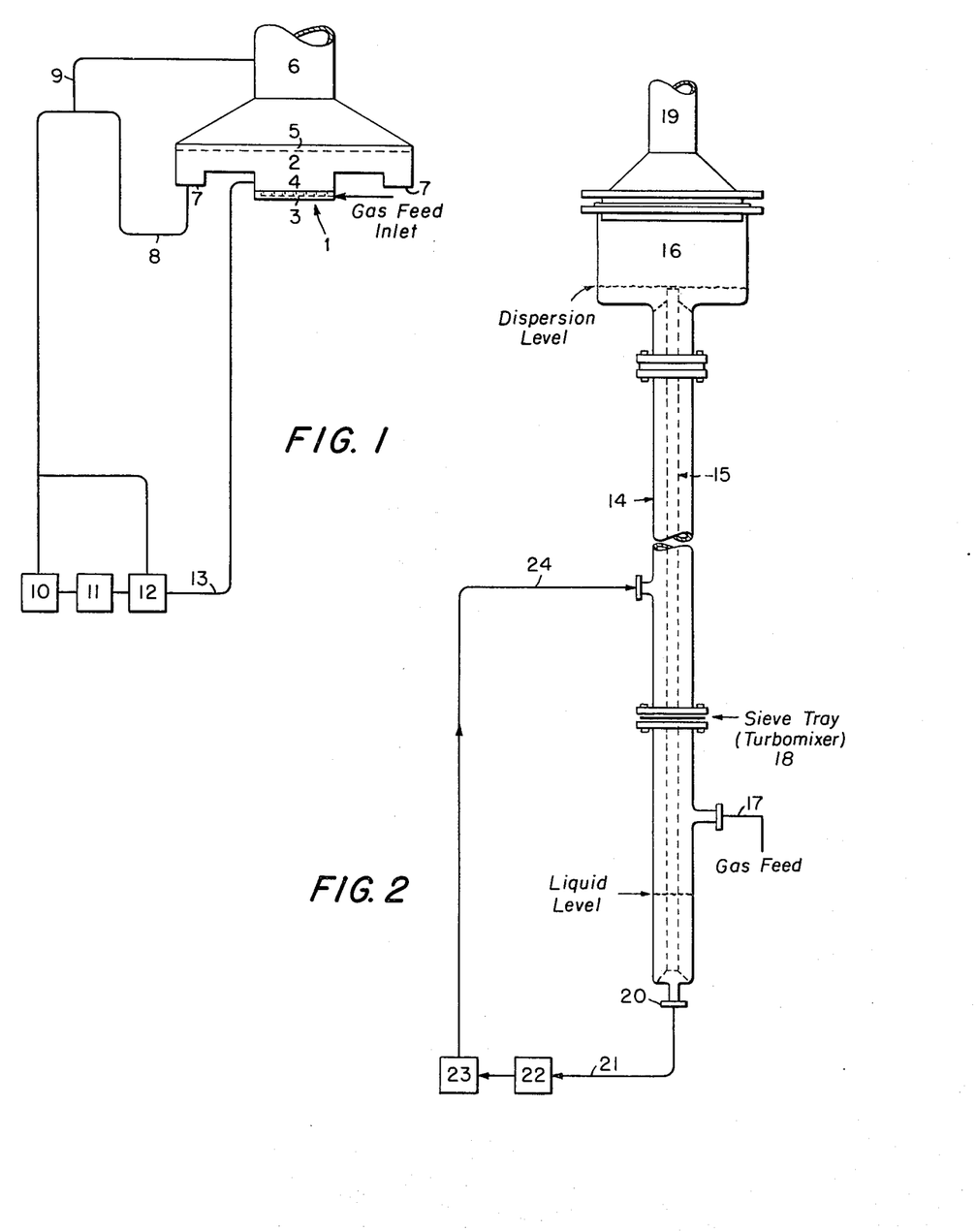
FIG. 1 represents one form of reaction system adapted for continuous operation in accordance with the invention in which the gases and catalyst are introduced at the bottom of the contactor, the gases intimately dispersed into the liquid catalyst phase, and the resulting dispersion passed through a relatively short reaction zone and then into a relatively wide gas separation zone, where the dispersion breaks, the gases escape and are vented, and the catalyst phase is recycled after separation of sulfur and dialkyl disulfides.
FIG. 2 represents another form of reaction system adapted for continuous or semicontinuous operation in which the gases are dispersed in the liquid phase, the dispersion passed through a relatively narrow annular reaction zone, and then to a gas separation zone, the gases separated and vented, and the catalyst returned to the bottom of the reaction zone via a downcomer tube running through the center of the zone. The catalyst solution is taken from the bottom of the apparatus, passed through a sulfur/disulfide separating system, and then returned to the reaction zone.

The relative rates of flow of the oxygen catalyst solution and the stream to be stripped of hydrogen sulfide and alkyl mercaptans depend upon the catalyst concentration and the $H_2S$ and alkyl mercaptan concentration in the gases, and has to be determined by trial-and-error experimentation. In general, the higher the hydrogen sulfide and alkyl mercaptan concentration, the higher the rate of flow of catalyst to stream that is required, and also the higher the catalyst concentration for quantitative removal. As illustrated in the apparatus of FIG. 2, with gas containing 1 percent hydrogen sulfide and a 5-liter-per-minute catalyst flow at a catalyst concentration of 50 percent, complete hydrogen sulfide removal was obtained at up to 283 liters per minute of gas flow. At 2 percent hydrogen sulfide in air and 5 liters per minute of catalyst flow at 50 percent catalyst concentration, complete hydrogen sulfide removal was obtained at up to 113 liters per minute of gas flow.

The rate of flow of the dispersion of catalyst solution, oxygen gas, and fluid stream through the reaction zone is not critical, but best results are obtained when thorough mixing is achieved. The upper limit on gas flow is imposed by the reaction or contact time required, and the length limit of the reaction zone. The lower limit of flow rate is not critical and can be as slow as practical, for instance, 10 liters per minute.

The liquid catalyst system can carry up to 10 percent by weight of sulfur without interfering with the efficiency of the reaction. At concentrations of sulfur above 10 percent, the liquid becomes rather viscous and is more difficult to circulate, while at the same time the hydrogen sulfide removal efficiency declines. Consequently, it is normally desirable to feed the catalyst at such a rate that after the transit time through the reactor the sulfur content is 10 percent or below, or else remove sulfur in proportion.

Quite important in the reaction time is the degree of subdivision of the oxygen gas and the gas or liquid containing hydrogen sulfide and alkyl mercaptans in the aqueous liquid catalyst solution. The more intimate the mixing, and the more finely divided the state of subdivision, the more efficient the conversion, and the more rapid the reaction.

Any gas-liquid contact system which ensures good contact between the phases can be used. In a continuous-flow system, concurrent, countercurrent, and cross-current flows can be used. Gas scrubbers can be used, as well as spray scrubbers or towers, perforated plate towers, wetted wall columns, bubblecap plate towers, sieve plate towers, packed towers, turbo-gas mixers, orifice-column mixers, injectors, jet mixers, turbo-gas absorbers, cascade towers, and bubble columns. Optimum reaction rates are obtained if a good dispersion of the oxygen gas and hydrogen sulfide/alkyl mercaptan stream is formed in the fluid catalyst phase. This can be achieved by intermixing of the gases in the liquid catalyst solution, using an efficient sparging system or highspeed mixing and/or blending equipment, such as a gas-liquid turbo mixer or a high-speed stirrer.

For best results, foaming should be reduced to a minimum. This is achieved by maintaining a ratio of liquid:-gas in the contactor within the range from about 0.25:1 to about 1:0.25. The optimum is about 1:1. The higher the amount of liquid, the faster is the reaction. A lower amount of liquid can also be used, which may impose restrictions on the gas velocity and the length of the contactor.

A particularly preferred apparatus in accordance with the invention includes a contactor defining a reaction or contact zone through which an intimate dispersion of the gas phase containing oxygen, hydrogen sulfide and alkyl mercaptans in the liquid catalyst solution is passed. Juxtaposed thereto is a relatively wide separating zone, where the velocity of the stream changes appreciably, and the dispersion breaks. Means are provided in the separator zone for withdrawing the liquid catalyst solution and for recirculating to the reaction zone, with means for separating sulfur therefrom, as well as any dialkyl disulfides. The gas in the separating zone is substantially free from hydrogen sulfide and alkyl mercaptans, and is vented.

The reaction or contact zone should be of dimensions to ensure good contact and retention of the liquid gas dispersion short of foam formation throughout the reaction time. The actual dimensions depend upon the flow capacity required. The diameter of the contactor is not critical, provided that the gas phase is properly dispersed throughout the liquid catalyst solution, and retained in dispersed form throughout the transit time through the contactor.

The length of the reaction zone should be from 2 to about 20 feet, preferably from about 3 to about 5 feet, and the diameter from about 4 inches to about 40 feet. For example, contactors as wide as 20 to 40 feet and 3 feet high can be designed for treatment of large amounts of gases, provided that the introduction of the gases is properly distributed on the bottom of the reactor.

Beyond the reaction zone, a gas-separating zone is provided, which is of relatively large diameter, as compared to the reaction zone, so as to afford a sudden volume expansion and a slowing in flow rate, producing a relatively quiescent zone in which the intimate gas-liquid dispersion breaks and rapid separation of gas and liquid follows. The ratio of reaction zone diameter to separating zone diameter is also important, to ensure a sufficiently quiescent zone for effective gas separation in a short time. This ratio ought to be within the range 1:1.2 to 1:20. While the ratio can exceed 1:20, there is no real advantage, and there is the practical disadvantage of unwieldy apparatus using available space inefficiently.

The ratio of diameter to height of the gas separating zone is within the range from about 60:1 to about 1:1, preferably from about 20:1 to about 1:1.

The depth or height of the gas-separating zone should be from 2 inches to about 10 feet, preferably from about 5 inches to about 3 feet, and the diameter from about 5 inches to about 60 feet. For example, gas separators as wide as 40 to 60 feet and 2 to 10 feet deep can be designed for treatment of large volumes of reaction mixture, provided that the introduction of the mixture is properly distributed on the bottom of the gas separator.

The gas separator zone has a gas vent, and a liquid outlet, for removal of these phases separately.

The liquid catalyst phase contains sulfur suspended therein, as well as any dialkyl disulfides. Means are provided whereby these can be separated and recovered. The sulfur is separated by any suspended solids separation technique, such as filtration, settling, flotation, or centrifuging. It can also be melted, and separated as an immiscible liquid phase in a liquid-liquid phase separator. The dialkyl disulfides are water-insoluble liquids, and are removed by decantation, and can be separated from the sulfur by allowing the sulfur to solidify, and then removing the dialkyl disulfides. The liquid catalyst phase can then be recycled to the reaction zone.

The apparatus can be fabricated of any material that is resistant to attack by the catalyst solution being circulated and by the waste gases. Stainless steel is quite satisfactory, and so are glass, polytetrafluoroethylene, neoprene, polyethylene, and polypropylene. Plastics can be employed as surfacing materials for metals that would be attacked by the catalyst solution.

Preferred embodiments of apparatus for carrying out the process of the invention are shown in the drawings, in which.

The apparatus shown in FIG. 1 comprises a tubular stainless steel contactor, represented here as defining a relatively short reaction chamber or zone 1, 10 feet in diameter and 3 feet long, and a cylindrical coaxial stainless steel separator, defining a separation chamber 2, 30 feet in diameter and 3 feet high, directly above and connected to the reaction chamber 1. An appropriate gas distribution system 3 is provided at the bottom of the contactor, such as several gas turbomixers with spargers to adequately disperse the gaseous mixture into the liquid catalyst solution. One or more sieve trays 4 are disposed in the contactor, if necessary, in order to ensure proper distribution of flow of the dispersion through the contactor. A gas feed inlet is provided, leading into the gas distribution system 3, and a liquid catalyst line 13 leads to the reaction chamber 1 above the gas distribution system 3.

The diameter of the separator chamber 2 can, for example, be from about 1.2 to about 10 times, preferably about 1.2 to about 3 times, greater than the diameter of the reaction chamber 1, and the height is from about 1 foot to about 10 feet, preferably from about 2 to about 5 feet.

The separator chamber 2 is provided at its upper part with a screen or baffle 5 in order to capture any liquid entrained with the exiting gases, which escape through the outlet 6 above. The annular recess 7 extending circumferentially about the separation chamber is connected to line 8 by means of which liquid catalyst solution containing suspended sulfur and dialkyl disulfides is withdrawn from the chamber. The vent 9 serves to discharge gases which might be entrained by the liquid.

Line 8 leads to an appropriate conventional system for separating the solid suspended sulfur. That shown in the drawing by way of example includes centrifugal separator 10 and a liquid-liquid phase separator 11 for the separation of the dialkyl disulfide liquid from the aqueous catalyst phase. Storage tanks 12 and other equipment are also provided but these can be omitted. The line 13 leads thence to the reaction chamber 1.

In operation, the gas containing oxygen (air), hydrogen sulfide and alkyl mercaptans is continuously fed via the gas feed inlet line to the bottom of the contactor into the gas distribution system 3, while the liquid catalyst solution is fed in via line 13 and mixed therewith to form an intimate dispersion short of foam formation in the reaction chamber 1. A continuing feed of gases and liquid into the gas distribution system 3 and of dispersion thence into the reaction chamber 1 leads to an upward flow of reaction solution through the reaction zone to the separator chamber 2, the transit time through the reaction zone to the separator chamber constituting the reaction time. This may be very brief, of the order of 0.1 second to several seconds or more, as desired or necessary for the gases being treated.

The gas-catalyst dispersion enters the separation chamber 2 where, due to the greatly increased diameter, and relatively slow flow rate, or relatively quiescent condition, the dispesion breaks and the gas separates, and is vented through the outlet 6. Such gas is substantially free from hydrogen sulfide and mercaptans. The catalyst solution, containing suspended sulfur and dialkyl disulfides, overflows into the annular recess 7 of the separator chamber 2, and is withdrawn through the outlet line 8. The sulfur is separated in the centrifuge 10, and the dialkyl disulfides in the phase separator 11. The catalyst solution, which does not require regeneration, is then recirculated to the reaction chamber 1 via line 13.

The apparatus shown in FIG. 2 has a similar construction, but the system for separation and recirculation of aqueous catalyst solution is different. In this case, the tubular reaction chamber 14 is glass-walled, 4 inches in internal diameter, and is annular; the annulus is 1 ¼ inches wide, surrounding a 1 ½-inch diameter stainless steel central downcomer or tube 15, 4 ¾ feet long, which extends from a point corresponding to the dispersion level in the separator chamber 16 to the bottom of the reaction chamber 14. Thence, line 21 leads from ports 20 to a tank 22 and a filter 23. A return line 24 for liquid catalyst solution leads to the reaction chamber 14.

The cylindrical glass separation chamber is 12 inches in diameter and 10 inches high but the height is not critical.

In this case, the gas feed inlet 17 at the bottom of the reaction chamber 14 terminates in a sieve tray or turbomixer 18, which is capable of forming an intimate dispersion of the entering gases in the liquid catalyst phase entering the annular reaction chamber 14 via line 24.

In operation, the dispersion passes upwardly through the reaction chamber 14 and enters the separator chamber 16, where the gas separates, and is vented via outlet 19. The liquid catalyst solution containing sulfur and any dialkyl disulfides overflows into downcomer 15, and passes downwardly through the downcomer 15, and is returned to the bottom of the annular reaction zone 14. There it is led out via ports 20 from the reaction chamber via line 21 to a tank 22 followed by filter 23, where the sulfur is separated. If dialkyl disulfides are present, a liquid-liquid separator is added for their removal. The liquid catalyst solution is returned to the reaction chamber through the inlet line 24.

The following Examples represent preferred embodiments of the apparatus of the invention, and shown how the apparatus can be used to separate hydrogen sulfide from gas streams.

EXAMPLE 1

In the runs to be described, an aqueous catalyst solution comprising a ferric ion chelate was prepared by dissolving 93 lbs. ferric sulfate (Ferrifloc, Tennessee Corp., 21.8% Fe) in 464 lbs. water. To the solution were added with agitation 373 lbs. trisodium salt of N-hydroxyethyl ethylene diamine triacetic acid as a 41 percent aqueous solution. To the clear solution were added 70 lbs. monoethanolamine with stirring so as to obtain 1000 lbs. of clear orange brown solution, pH 10.2. For use as a catalyst solution this concentrate was diluted with various amounts of water. The concentrate contains 2.0% Fe, a 10% solution contains 0.2% Fe.

Control A: Packed Column of the Prior Art.

$H_2S$ was removed from a gas stream by passing it counter currently to a liquid catalyst stream under the following conditions:

| | |
|---|---|
| Column | : glass 22 feet high, 4 inches inside diameter, with a gas inlet line at the bottom, for entry of oxygen (air) and the gas stream containing hydrogen sulfide and a liquid catalyst inlet line and gas outlet at the top, packed with ½ inch Pall rings. Sampling cocks at 6 levels. |
| Catalyst Solution | : 40 liters 10% solution at 0.20% Fe. |
| $H_2S$ Stream | : 1500 ppm $H_2S$ in air (by volume). |
| Duration of Test | : 70 hours. |
| Oxidation-Reduction Cycles | : 38. |
| pH Catalyst Solution | : 7.7 to 7.2. |
| Temperature | : 20°–28°C. |
| Rate of Gas Stream | : 4 cfm. |
| Pressure drop through column | : 2 inches water. |
| Rate of Catalyst Solution Flow | : 0.9 gal./min. |

The results were as follows:

TABLE I

| Run No. | $H_2S$ in Feed Gas PPM | $H_2S$ in Effluent Gas PPM | $H_2S$ Removal % | Residence Time, Sec. | % Fe in Catalyst |
|---|---|---|---|---|---|
| 1 | 1500 | 600 | 60 | 4 | 0.20 |
| 2 | 1500 | <2 | >99.8 | 8 | 0.20 |
| 3 | 1500 | Nil | 100 | 12 | 0.20 |

The results show that a residence time of 12 seconds is needed for complete $H_2S$ removal, at 1500 ppm $H_2S$ In feed gas.

The efficiency of $H_2S$ removal was limited by the fact that at higher flow rates foaming occurred, which interfered with the operation; prolonged operation caused deposit of sulfur on the packing, with resulting clogging of the column.

Control B: Sieve Tray Column of the Prior Art.

$H_2S$ was removed from a gas stream by passing it countercurrently to a liquid catalyst stream under the following conditions:

| | |
|---|---|
| Column | : glass 22 feet high, 4 inches inside diameter, with a gas inlet line at the bottom, for entry of oxygen (air) and the gas stream containing hydrogen sulfide and a liquid catalyst inlet line and gas outlet at the top, and 70 sieve plates. Sampling cocks at 6 levels. |
| Catalyst Solution | : 40 liters 10% solution at 0.20% Fe. |
| $H_2S$ Stream | : 1500 ppm in air. |
| Duration of Test | : 23 hours. |
| Oxidation-Reduction Cycles | : 16. |
| pH Catalyst Solution | : 8.0 to 7.5. |
| Temperature | : 20°–30°C. |
| Rate of Gas Stream | : 4 cfm. |
| Pressure drop through column | : 32 inches water. |
| Rate of Catalyst Solution Flow | : 0.6 gal./min. |

The $H_2S$ concentration in air was raised after Run No. 5 to higher levels, as shown below, to determine the limit of complete removal:

TABLE II

| Run No. | $H_2S$ in Feed Gas PPM | $H_2S$ in Effluent Gas PPM | $H_2S$ Removal % | Residence Time, Sec. | % Fe in Catalyst |
|---|---|---|---|---|---|
| 4 | 1,500 | 80 | 94.7 | 4 | 0.20 |
| 5 | 1,500 | Nil | 100 | 8 | 0.20 |
| 6 | 3,750 | Av. 600 | 84.0 | 8 | 0.20 |
| 7 | 3,750 | Nil | 100 | 12 | 0.20 |
| 8 | 10,000 | 2000 | 80.0 | 4 | 0.20 |
| 9 | 10,000 | 4 | 99.96 | 12 | 0.20 |
| 10 | 10,000 | Nil | 100 | 20 | 0.20 |

The residence time required for complete $H_2S$ removal at 1500 ppm $H_2S$ in the gas feed is 8 seconds, but this rises to 12 seconds at 3750 ppm and 20 seconds at 10,000 ppm.

The sieve tray column is more efficient than the packed column, since with 4 seconds residence time it removes 94.7 percent of a 1500 ppm $H_2S$ stream compared to 60 percent for the packed column. However, in this column also, higher rates of flow cause foaming.

Control C: Tank Containing Catalyst Solution With No Agitator - Stationary Condition.

A 5 l glass flask was filled with air containing 2000 ppm $H_2S$. 50 ml of a 10 percent catalyst solution prepared as in Example 1 was added and the flask closed. It was occasionally shaken and the $H_2S$ content of the gas phase determined. After 60 minutes, the $H_2S$ concentration had decreased to 20 ppm, corresponding to a $H_2S$ removal of 99.0 percent. Residence Time: 3600 seconds.

Control C demonstrates that in the absence of a contactor to increase the liquid-gas interface, the residence time is very high.

Example of the Invention = Contactor of FIG. 2.

$H_2S$ was removed from a gas stream by passing it counter-currently to a liquid catalyst stream under the following conditions:

| | |
|---|---|
| Column | : glass 3⅓ feet high, 4 inches inside diameter, containing 2 perforated plates; catalyst solution occupies 32 inches depth of tubular reaction chamber. |
| Separator Chamber | : 12 inches inside diameter and 16 inches high. |
| Catalyst Solution | : 40 l 50% solution at 1.00% Fe. |
| $H_2S$ Stream | : 1% $H_2S$; 1% $CO_2$; 20% Oxygen, 78% Nitrogen. |
| Duration of Test | : 42 hours. |
| Oxidation-Reduction Cycles | : 80. |
| pH Catalyst Solution | : 9.5 to 8.7. |
| Temperature | : 22°–26°C. |
| Rate of Gas Stream | : 10 cfm. |
| Pressure Drop | : 19 inches water. |
| Rate of Catalyst Solution Flow | : 1.2 gal./min. |

TABLE III

| Run No. | $H_2S$ in Feed Gas PPM | $H_2S$ in Effluent Gas PPM | $H_2S$ Removal % | Residence Time, Sec. | % Fe in Catalyst |
|---|---|---|---|---|---|
| 11 | 10,000 | 10 ± 5 | 99.9 | 0.35 | 1.00 |

In the reactor of the invention, a residence time of 0.35 second suffices to remove 99.9 percent of the $H_2S$ at 10,000 ppm $H_2S$ in the gas feed.

By changing the catalyst solution above to 40 l 87 percent solution at 1.75 percent Fe during a 20 hour run, the $H_2S$ removal was further improved:

| | | | | | |
|---|---|---|---|---|---|
| 12 | 10,000 | 2 | 99.98 | 0.35 | 1.75 |

These results demonstrate the remarkable improvement in efficiency in the apparatus of the invention.

Having regard to the foregoing disclosure, the following is claimed as the inventive and patentable embodiments thereof:

1. An apparatus for the capture of hydrogen sulfide and alkyl mercaptans in gaseous streams, and the catalytic conversion thereof to sulfur and dialkyl disulfides, respectively, comprising, in combination, a contactor defining a substantially cylindrical elongated reaction chamber; a gas feed inlet at the bottom of the reaction chamber; a liquid aqueous catalyst solution inlet at the bottom of the reaction chamber; means for forming an intimate unstable dispersion short of foam formation of gaseous oxygen, hydrogen sulfide, and alkyl mercaptans entering via the gas feed inlet in liquid aqueous catalyst solution and for passing the dispersion in turbulent flow cocurrently upwardly through the reaction chamber; and a gas separator for reception of dispersion from the reaction chamber and defining a substantially cylindrical gas separation chamber directly above the reaction chamber, coextensive therewith in a central portion and having a peripheral portion extending circumferentially about and beyond the peripheral portion of the reaction chamber, the gas separation chamber having an overall diameter larger than the diameter of the reaction chamber and exposing a relatively large surface area of dispersion to a gas layer thereabove within the gas separation chamber to facilitate breaking of the dispersion into a lower liquid layer and a separation of gas therefrom, the gas separator having in an upper portion a gas outlet for removal of the gas in the gas layer and, at or below the level of the liquid layer, a liquid outlet for liquid aqueous catalyst solution containing sulfur and dialkyl disulfides; a conduit extending axially from the gas separator chamber through the elongated reaction chamber toward the inlet end of the reaction chamber, and adapted to carry liquid catalyst solution from the gas separator chamber; and means for maintaining a liquid level within the gas separation chamber and thereby within the reaction chamber by overflow; the ratio of the diameter of the reaction chamber to the diameter of the gas separator chamber being within the range from about 1:1.2 to about 1:20, expressed in metric units, the length of the reaction chamber being within the range from about 2 feet to about 20 feet, and the diameter of the reaction chamber being within the range from about 4 inches to about 40 feet; the ratio of diameter to height of the gas separation chamber being within the range from about 60:1 to about 1:1, the height of the gas separation chamber being within the range from about 2 inches to about 10 feet, and the diameter of the gas separation chamber being within the range from about 5 inches to about 60 feet.

2. An apparatus in accordance with claim 1 which includes means for separating sulfur and alkyl disulfide from the catalyst solution from the gas separator, and means for recycling the resulting catalyst solution to the reaction chamber.

3. An apparatus in accordance with claim 1, in which the contacter reaction chamber is coaxial with the separator chamber, with a direct connection at the top of the reaction chamber to the bottom of the separator chamber.

4. An apparatus in accordance with claim 1, in which the elongated contactor is tubular, the conduit is a coaxial tube, and the gas separator is cylindrical and disposed coaxially at one end of the contactor, with the conduit projecting into the gas separator chamber to a point establishing by overflow the dispersion liquid level in the gas separator chamber.

5. An apparatus in accordance with claim 1, in which the height of the reaction chamber is within the range from about 3 feet to about 5 feet.

6. An apparatus in accordance with claim 1, in which the contactor reaction chamber is tubular, the gas separator is cylindrical and disposed coaxially at one end of the contactor with a direct connection at the top of the reaction chamber to the bottom of the separator chamber, and the liquid outlet for liquid aqueous catalyst solution in the gas separator chamber is at one end of a conduit extending axially from the bottom of the gas separator chamber through the contactor reaction chamber to the inlet end thereof, and adapted to carry liquid catalyst solution from the gas separator chamber, the conduit projecting into the gas separator chamber to a point establishing by overflow the dispersion liquid level in the gas separator chamber.

* * * * *